United States Patent [19]

Hornbeck

[11] 4,377,545

[45] Mar. 22, 1983

[54] METHOD OF MAKING CORRUGATED REINFORCED THERMOPLASTIC PIPE

[75] Inventor: Robert L. Hornbeck, Mineral Wells, W. Va.

[73] Assignee: Borg-Warner Chemicals, Inc., Parkersburg, W. Va.

[21] Appl. No.: 274,119

[22] Filed: Jun. 16, 1981

[51] Int. Cl.³ .............................................. D01D 5/20
[52] U.S. Cl. ................................... 264/167; 264/173; 264/176 R; 264/568
[58] Field of Search ............ 264/167, 173, 176, 209.8, 264/568

[56] References Cited

U.S. PATENT DOCUMENTS

| | | | |
|---|---|---|---|
| 3,372,920 | 3/1968 | Corbett et al. | 264/95 |
| 3,379,221 | 4/1968 | Harry et al. | 138/148 |
| 3,538,209 | 11/1970 | Hegler | 264/90 |
| 3,561,493 | 2/1971 | Maillard | 264/173 |
| 4,125,585 | 11/1978 | Rosenbaum | 264/173 |
| 4,196,464 | 4/1980 | Russell | 264/173 |

*Primary Examiner*—Donald E. Czaja
*Assistant Examiner*—W. Thompson
*Attorney, Agent, or Firm*—Richard J. Schlott

[57] ABSTRACT

Disclosed is a method of making corrugated reinforced thermoplastic pipe having interior and exterior tubes with corrugations therebetween, comprising extruding through a pipe forming die, the interior and exterior tubes of a pipe at one linear rate while extruding a third skin or ribbon at a faster linear rate whereby the third skin buckles between the interior and exterior tubes to create corrugations in the space between the two tubes.

1 Claim, 2 Drawing Figures

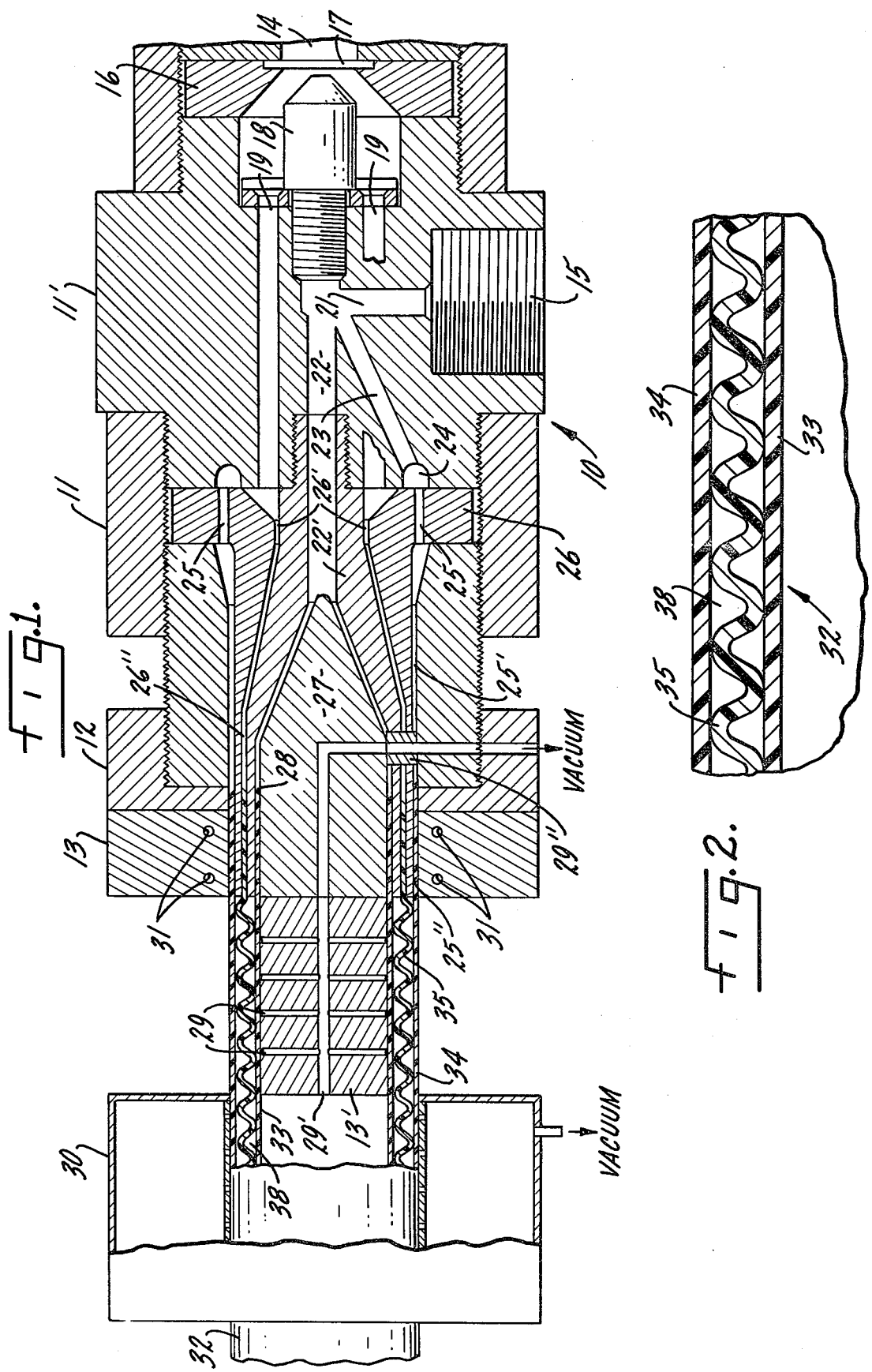

METHOD OF MAKING CORRUGATED REINFORCED THERMOPLASTIC PIPE

BACKGROUND OF THE INVENTION

The present invention relates to a method of making rigid, stiff, reinforced thermoplastic pipe. Thermoplastic pipe made of solid plastics such as polyvinyl chloride (PVC) and graft acrylonitrile-butadiene-styrene (ABS) is sold in huge quantities for use in water supply, sanitary and storm pipes, as well as many other applications. One great advantage of the thermoplastic pipe is that it is lighter in weight than the pipe it usually replaces or displaces; another advantage is its ease of fabrication into fluid systems. Its structural integrity is good for many applications, but improvement is desired in other applications.

For many applications a desirable pipe is a smooth surfaced, fluid impervious pipe of a thickness to give it good structural integrity, but light enough to have the light-weight and ease of fabrication advantages of plastic pipe. A simple, inexpensive and novel method of making such a pipe and the pipe made by such method is the subject matter of this invention.

The pipe made in accordance with the method of the present invention is a lightweight, rigid pipe having spaced thermoplastic exterior and interior tubes and a buckled or corrugated skin or ribbon occupying the space between the exterior and interior tubes. The corrugated skin acts to space, brace and reinforce the pipe made from the two tubes. The exterior and interior tubes, as well as the buckled skin, are preferably of the same thermoplastic material. The tubes and the ribbon may, however, be of different thermoplastic resins.

The manufacture of the present pipe requires the use of two extruders feeding to a common pipe tool or die. Appropriate passageways are provided in the die for receiving the plastic from one extruder and forming the interior and exterior tubes and for receiving plastic from another extruder to form the buckled skin. The interior and exterior tubes are spaced, for example, 0.125 of an inch for a 4" OD pipe, and are held apart by pulling a vacuum on the tubes as they exit the extruder die. The ribbon or skin is extruded into this space at a linear rate exceeding the rate of the plastic which forms the interior and exterior tubes. The ribbon will be unsupported, and it either swells and touches the interior wall of the exterior tube or collapses and touches the exterior wall of the interior tube. In either case, the ribbon will touch the tube surfaces, buckle and provide the corrugations.

The apparatus employed for carrying out the method of the present invention comprises a plurality of extruders, preferably two, connected to a single die having multiple passages for receiving and forming the plastic discharged by the extruders.

BRIEF DESCRIPTION OF THE DRAWINGS

A better understanding of the novel method of manufacturing the above-described pipe is disclosed in the drawings wherein:

FIG. 1 is a sectional view, partially fragmentary, of an extrusion die used in making the pipe; and FIG. 2 is a cross-sectional view of a pipe made with the extrusion die of FIG. 1.

Disclosed in FIG. 1 is a tool or die utilized for carrying out the method of the present invention and designated generally by the reference numeral 10. The tool 10 comprises an adapter member 11, a die plate 12 and a forming die 13. The adapter member 11 comprises a housing 11' having openings 14 and 15 which are attached respectively to the discharge end of two screw extruders (not shown). An inlet plate 16 is provided in the housing 11' and contains an opening 17 and a diverter plug or mandrel 18. A plurality of passageways 19 are in communication with the openings 17 and 14.

The opening 15 in the housing 11' is in communication with a passageway 21 which in turn is in communication with passageways 22 and 23. The passageways 23 communicate with a manifold 24 which further communicates with passageway 25 provided in a flow restrictor 26. A passageway 25' in the housing 11' connects the passageway 25 with an orifice 25" in the forming die 13. Passageway 22 is formed by a bore in the housing 11' and a bore in a nozzle element 22'. A restriction 26' is formed by the interior surface of the flow restrictor 26 and the exterior surface of the nozzle 22'. The restriction 26' is in communication with passageway 26".

The die plate 12 contains a mandrel or spreader 27 and also a passageway 28, which passageway extends into the forming die 13. The forming die is heated and/or cooled by fluid passages 31 which are connected to a conventional heat exchanger (not shown). In order to size the inside diameter of the inner tube, an extension 13' is provided on the forming die 13. The extension has sizing orifices 29 connected to a passageway 29' formed in the extension 13', the forming die 13, the die plate 12, and an appropriate spider 29". The passageway 29' is connected to a vacuum pump (not shown). In order to size the outer diameter of the outer tube, a conventional pipe sizing vacuum unit 30 is employed.

The rigid pipe 32 formed by the method of this invention is seen in both FIG. 1 and FIG. 2 and comprises and interior tube 33, an exterior tube 34, a space 38 between the tubes 33, 34 and a skin or ribbon 35.

In the utilization of the tool 10 to carry out the present invention to form the pipe 32, a first thermoplastic material, preferably an ABS graft polymer, which has been heated to its melt temperature in an extruder (not shown), enters the opening 15 and passes through the passageway 21 and to the passageways 22 and 23. A portion of the first thermoplastic material passes through passageway 23 to the manifold 24, thence through the passageway 25, through the passageway 25' and through the orifice 25" of the forming die 13 to form the exterior tube 34 of the pipe 32. At the same time, another portion of the first thermoplastic material flows from passageway 21 through passageway 22, by spreader 27, through the passageway 28 and through the forming die 13 to form the interior tube 33 of the pipe 32. A vacuum is drawn through the orifices 29 and the passageway 29' at this time to size the tube 33. At the same time, a vacuum is drawn through the sizing unit 30 to size the outer tube 34.

Simultaneously, a second thermoplastic material, preferably, but not necessarily the same as the first thermoplastic material, is discharged from an extruder into the opening 14 and passes through the opening 17, past the diverter plug 18, through the passageways 19, through the restriction 26', through the passageway 26" and the forming die 13 to form the skin or ribbon 35. The ribbon 35 is discharged into the space 38 between the tubes 33 and 34.

In order to buckle the ribbon 35 to provide the corrugations in the space 38 between the tubes 33, 34, the speed of the extruder feeding opening 14 of the die is made greater than the speed of the extruder feeding opening 15. This causes the ribbon 35 to buckle in the space 38. As the ribbon 35 buckles, it contacts the interior and exterior tubes 33,34 to form the corrugations.

While a particular tool 10 has been described as one means for carrying out the present method, other tools, as well as other feed means to the openings 14 and 15, can be employed. As one example, the extruder and tool structure shown in U.S. Pat. No. 4,054,403 can be used in carrying out the present method.

I claim:

1. A method of making a rigid, stiff, reinforced thermoplastic pipe made of spaced interior and exterior tubes and having spacing and bracing means therebetween comprising, extruding through multiple and separate die passages of a pipe shaping tool at one die passage at a first speed and a first thermoplastic material forming the interior tube, and at a second die passage a second thermoplastic material forming the exterior tube of said pipe while simultaneously forming a space therebetween, and further extruding through a third die passage a third thermoplastic material in the form of a ribbon into said space at a speed faster than said first speed whereby said ribbon buckles, contacts the inner diameter of the exterior tube and the outer diameter of the interior tube and forms a corrugated-like surface which acts as said spacing and bracing means between said interior and exterior tubes.

* * * * *